US006687824B1

United States Patent
Shin

(10) Patent No.: US 6,687,824 B1
(45) Date of Patent: *Feb. 3, 2004

(54) DIGITAL IMAGE CODING/DECODING APPARATUS AND METHOD FOR RECORDING AND RESTORING A SIGNATURE IMAGE USING WATERMARKING

(75) Inventor: Hyun-doo Shin, Sungnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/345,726

(22) Filed: Jul. 1, 1999

Related U.S. Application Data

(60) Provisional application No. 60/091,542, filed on Jul. 1, 1998.

(51) Int. Cl.[7] .................................................. H04N 7/08
(52) U.S. Cl. ........................ 713/176; 713/179; 382/100; 382/232; 348/408.1
(58) Field of Search ................................ 713/176, 179; 382/100, 115, 232; 348/408.1

(56) References Cited

U.S. PATENT DOCUMENTS

| | | | | |
|---|---|---|---|---|
| 4,801,939 A | * | 1/1989 | Jones .......................... | 342/25 |
| 5,859,920 A | * | 1/1999 | Daly et al. .................. | 382/115 |
| 5,870,499 A | * | 2/1999 | Bender et al. ............... | 382/232 |
| 5,953,700 A | * | 9/1999 | Kanevsky et al. ......... | 704/270.1 |
| 6,037,984 A | * | 3/2000 | Isnardi et al. ........... | 375/240.21 |
| 6,104,826 A | * | 8/2000 | Nakagawa et al. ......... | 382/100 |
| 6,185,312 B1 | * | 2/2001 | Nakamura et al. .......... | 382/100 |
| 6,240,121 B1 | * | 5/2001 | Senoh ........................ | 375/130 |
| 6,332,030 B1 | * | 12/2001 | Manjunath et al. ......... | 382/100 |
| 6,415,042 B1 | * | 7/2002 | Shin ........................... | 382/100 |
| 6,453,053 B1 | * | 9/2002 | Wakasu ...................... | 382/100 |

OTHER PUBLICATIONS

Information Processing Society of Japan, "Method of Combining Image and Text Using Orthogonal Transform", pp. 1841–1842.

(List continued on next page.)

Primary Examiner—Ly V. Hua
(74) Attorney, Agent, or Firm—Sughrue Mion, PLLC

(57) ABSTRACT

Digital image encoding/decoding apparatus and methods for recording a signature image using watermarking, and for restoring the recorded signature image are provided. The digital image coding apparatus for recording a signature image on a host image using watermarking, includes a first discrete wavelet transform portion for receiving a host image and performing discrete wavelet transform thereon, thereby outputting M×M discrete wavelet coefficients where M is a predetermined positive integer, a second discrete wavelet transform portion for receiving a signature image and performing discrete wavelet transform thereon, thereby outputting N×N discrete wavelet coefficients, where N is a predetermined positive integer smaller than M, a pseudo-random number generator for receiving an encryption code for determining a predetermined rule for generating pseudo-random numbers and generating the pseudo-random numbers in accordance with the predetermined rule corresponding to the encryption code, and a coefficient replacement portion for selecting the replacing locations of N×N pixels using the pseudo-random numbers, and replacing the coefficients of the selected N×N pixel locations among M×M discrete wavelet coefficients with N×N wavelet coefficients, thereby outputting replaced M×M wavelet coefficients. Since transmission is made such that a portion of signature image coefficients is superimposed on that of host image coefficients. Thus, addition of signature image coefficients does not increase the amount of transmitted data.

28 Claims, 4 Drawing Sheets

OTHER PUBLICATIONS

The Information and Systems Society The Institute of Electronics, Information and Communication Engineers; "The Embedding of Signature Data in Wavelet Conversion" Collected Research of the Electronic Data Communications Society, D–II, vol. 179, No. 6, pp. 1017–1024, Jun. 1996.

Department of Electrical and Computer Engineering University of Toronto; Deepa Kundur, et al. "A Robust Digital Image Watermarking Method using Wavelet–Based Fusion".

Fraunhofer Institute for Computer Graphics; Jian Zhao et al.; "Embedding Robust Labels into Images for Copyright Protection"; Aug. 1995.

Department of Electronic and Electrical Engineering, Trinity College; J.J.K. O Ruanaidh; "Watermarking Digital Images for Copyright Protection" IEE 1995.

* cited by examiner

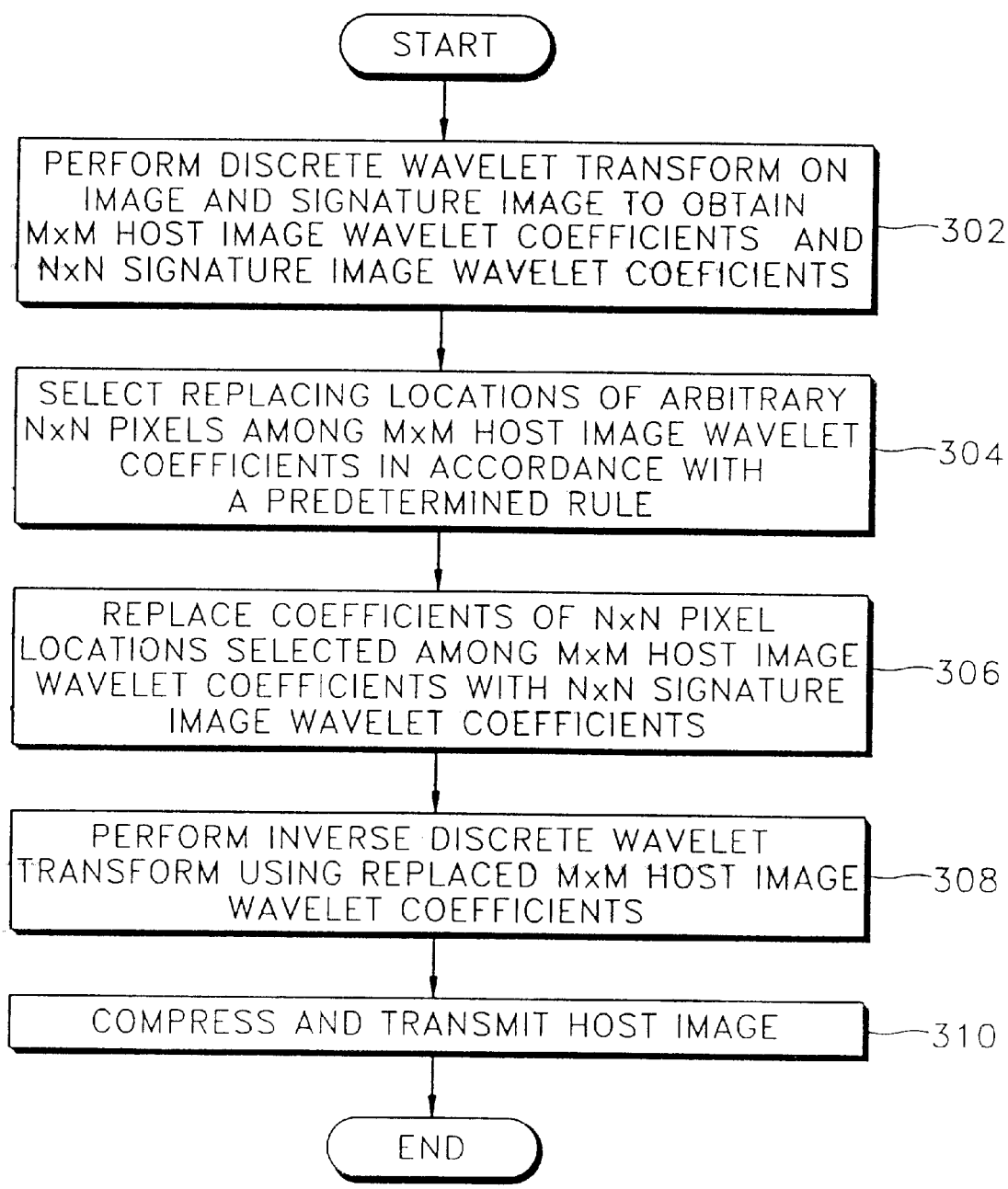

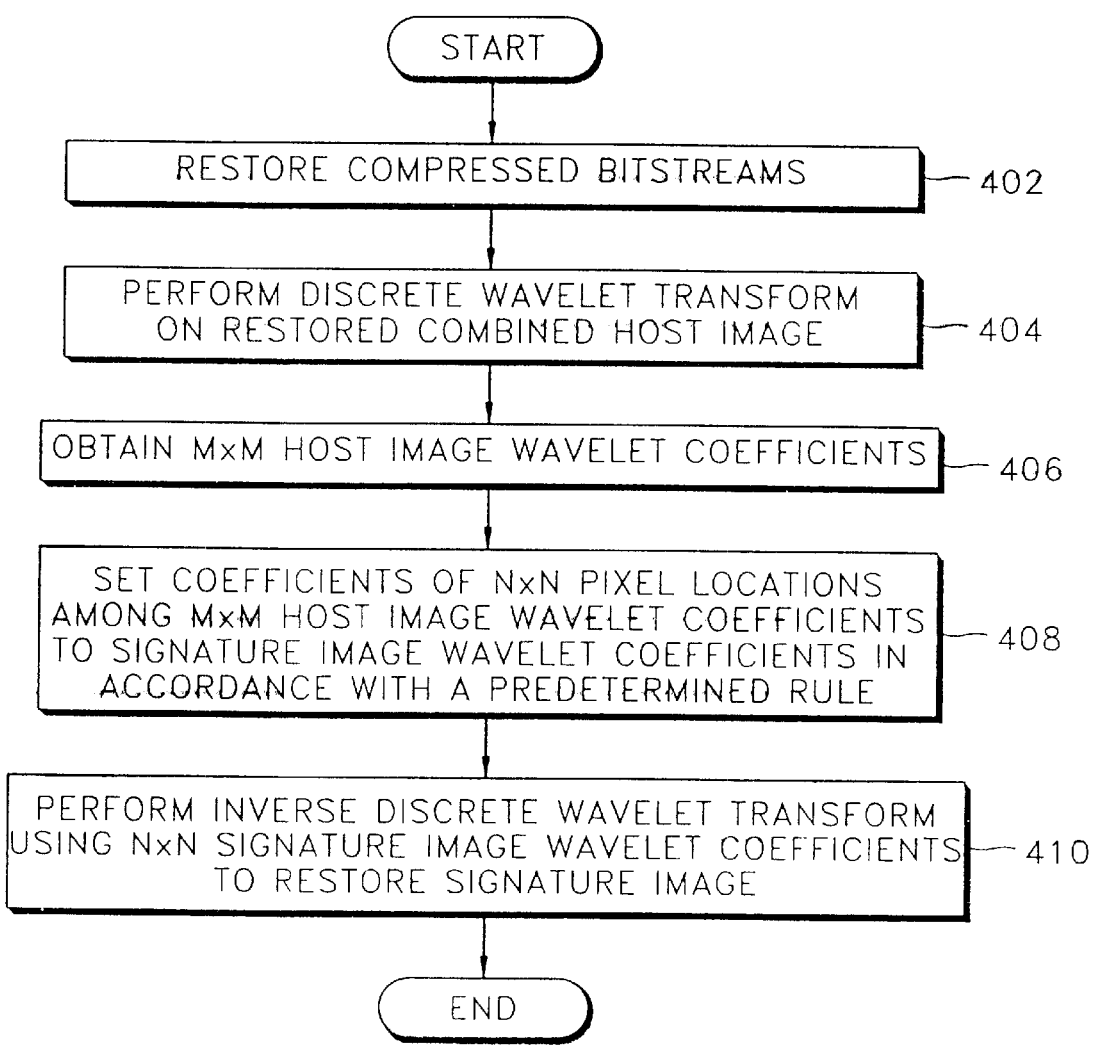

DIGITAL IMAGE CODING/DECODING APPARATUS AND METHOD FOR RECORDING AND RESTORING A SIGNATURE IMAGE USING WATERMARKING

RELATED APPLICATION DATA

This application claims the benefit of the provisional patent application entitled "Method and Apparatus for Reproducing Signature Image in Watermarked Image", U.S. Ser. No. 60/091,542, filed by the applicant of the present invention on Jul. 1, 1998. The content of the provisional patent application is incorporated herein by reference.

BACKGROUND OF THE INVENTION

1. Field of the Invention

The present invention relates to a digital image encoding apparatus and method and a corresponding decoding apparatus and method. More particularly, the invention relates to a digital image encoding apparatus and method for recording a signature image using watermarking, and a decoding apparatus and method for restoring the recorded signature image.

Also, the present invention relates to a digital image codec apparatus for recording and restoring a signature image using watermarking.

Further, the present invention relates to a digital image encoding method for recording a signature image using watermarking, and a decoding method for restoring the recorded signature image.

2. Description of the Related Art

Watermarking is a technology in which an original image, i.e., a host image with a signature image secretly embedded thereon, is transmitted. Upon receipt of the original image, only the host image is visible with the signature image being invisible at the receiver. The signature image may be identified by a special detection apparatus, e.g., a decryption apparatus. The watermarking technology is used for providing security and authenticating rights.

FIG. 1 is a conceptual block diagram illustrating a conventional digital image codec apparatus 1 for generating a watermarked image 8 and extracting a signature image 14 from the watermarked image. In the conventional digital image codec apparatus, during encoding, a DCT (Discrete Cosine Transform) 2 is performed on a host image 3 and a secret signature image 4 to be transmitted, thereby extracting DCT coefficients for the respective images. The DCT coefficients are encoded by an encoder 5. Here, the DCT coefficient components of the signature image 4 are encoded by a separate encryption encoder 6 that controls the encryption operation. In such a manner, the DCT coefficients of the host image 3 and the DCT coefficients of the signature image 4 inserted into the DCT coefficients of the host image 3 after being encoded, can be transmitted. An IDCT (Inverse Discrete Cosine Transform) 7 is performed on the DCT coefficients 2A of the host image and the DCT coefficients 2B of the signature image inserted into the DCT coefficients of the host image, thereby obtaining a watermarked image 8 in which only the host image is visible, while the signature image is not visible.

The signature image 4 watermarked on the host image 3 is decoded by a special decryption apparatus to then be restored. During restoration, IDCT is performed on a watermarked image, thereby extracting DCT coefficients thereof. Next, the extracted DCT coefficients 2A obtained by performing DCT on the original host image 3, are separated from the DCT coefficients of the watermarked image at subtractor 10, thereby extracting DCT coefficient components of the encoded signature image. Then, a decoder 11 decodes the DCT coefficient components of the encoded signature image. Here, the encryption decoder 11 performs a control operation for the decryption process. The DCT coefficients of the signature image decoded by the decryption control operation are again IDCT-performed 13, thereby restoring the signature image.

As described above, in the conventional digital image codec apparatus for encoding and decoding a signature image 4 by conventional watermarking, the same original host image 3 as that used at a transmission side must be provided in order to restore the signature image 4 at a receiver side. Also, since the DCT coefficients 2B of the signature image inserted into the DCT coefficients 2A of the host image are transmitted together with the DCT coefficients of the host image, the amount of transmitted data corresponding to the quantity of the signature image is increased.

SUMMARY OF THE INVENTION

It is a first object of the present invention to provide a digital image coding apparatus, which can transmit a signature image without increasing the amount of data to be transmitted.

It is a second object of the present invention to provide a digital image decoding apparatus, which can restore a signature image from the data coded by the digital image coding apparatus without the original host image.

It is a third object of the present invention to provide a digital image codec apparatus which can transmit a signature image without increasing the amount of data to be transmitted, and can restore a signature image without the original host image.

It is a fourth object of the present invention to provide a digital image coding method implemented according to the basic operation of the digital image coding apparatus.

It is a fifth object of the present invention to provide a digital image decoding method implemented according to the basic operation of the digital image decoding apparatus.

To achieve the first object of the present invention, there is provided a digital image coding apparatus for recording a signature image on a host image using watermarking, the apparatus including a first discrete wavelet transform portion for receiving a host image and performing discrete wavelet transform thereon, thereby outputting M×M discrete wavelet coefficients where M is a predetermined positive integer, a second discrete wavelet transform portion for receiving a signature image and performing discrete wavelet transform thereon, thereby outputting N×N discrete wavelet coefficients, where N is a predetermined positive integer smaller than M, a pseudo-random number generator for receiving an encryption code for determining a predetermined rule for generating pseudo-random numbers and generating the pseudo-random numbers in accordance with the predetermined rule corresponding to the encryption code, and a coefficient replacement portion for selecting the replacing locations of N×N pixels using the pseudo-random numbers, and replacing the coefficients of the selected N×N pixel locations among M×M discrete wavelet coefficients with N×N wavelet coefficients, thereby outputting replaced M×M wavelet coefficients.

To achieve the second object of the present invention, there is provided a digital image coding method for recording a signature image on a host image using watermarking, the method including the steps of receiving a host image and performing discrete wavelet transform thereon, thereby outputting M×M discrete wavelet coefficients, where M is a predetermined positive integer, receiving a signature image and performing discrete wavelet transform thereon, thereby outputting N×N discrete wavelet coefficients, where N is a predetermined positive integer smaller than M, receiving an encryption code for determining a predetermined rule for generating pseudo-random numbers and generating the pseudo-random numbers in accordance with the predetermined rule corresponding to the encryption code, selecting the replacing locations of N×N pixels using the pseudo-random numbers, and replacing the coefficients of the selected N×N pixel locations among M×M discrete wavelet coefficients with N×N wavelet coefficients, thereby outputting replaced M×M wavelet coefficients.

To achieve the third object of the present invention, there is provided a digital image decoding apparatus for restoring a signature image embedded on a host image using watermarking, the apparatus including: a pseudo-random number generator for receiving an encryption code and generating pseudo-random numbers in accordance with a predetermined rule according to the encryption code, a coefficient separation portion for setting separating locations of N×N pixels using the pseudo-random numbers and separating the wavelet coefficients corresponding to the N×N pixel separating locations among M×M wavelet coefficients, thereby outputting separated N×N wavelet coefficients, and an inverse discrete wavelet transform portion for performing inverse discrete wavelet transform using the separated N×N wavelet coefficients, thereby outputting a restored signature image.

To achieve the fourth object of the present invention, there is provided a digital image decoding method for restoring a signature image embedded on a host image using watermarking, the method including the steps of receiving an encryption code and generating pseudo-random numbers in accordance with a predetermined rule according to the encryption code, setting separating locations of N×N pixels using the pseudo-random numbers, separating the wavelet coefficients corresponding to the N×N pixel separating locations among M×M wavelet coefficients, thereby outputting separated N×N wavelet coefficients, and performing an inverse discrete wavelet transform using the separated N×N wavelet coefficients, thereby outputting a restored signature image.

To achieve the fifth object of the present invention, there is provided a digital image codec apparatus for recording a signature image on a host image using watermarking, and restoring the signature image from a watermarked image having the signature image embedded thereon, the apparatus including a first discrete wavelet transform portion for receiving a host image and performing discrete wavelet transform thereon, thereby outputting M×M discrete wavelet coefficients where M is a predetermined positive integer, a second discrete wavelet transform portion for receiving a signature image and performing discrete wavelet transform thereon, thereby outputting N×N discrete wavelet coefficients, where N is a predetermined positive integer smaller than M, a first pseudo-random number generator for receiving an encryption code for determining a predetermined rule for generating pseudo-random numbers and generating the pseudo-random numbers in accordance with the predetermined rule corresponding to the encryption code, a coefficient replacement portion for selecting the replacing locations of N×N pixels using the pseudo-random numbers, and replacing the coefficients of the selected N×N pixel locations among M×M discrete wavelet coefficients with N×N wavelet coefficients, thereby outputting replaced M×M wavelet coefficients, a second pseudo-random number generator for receiving the encryption code and generating pseudo-random numbers in accordance with a predetermined rule corresponding to the encryption code, a coefficient separation portion for setting separating locations of N×N pixels using the pseudo-random numbers, and separating the wavelet coefficients corresponding to the N×N pixel separating locations among M×M wavelet coefficients for the combined host image, thereby outputting N×N wavelet coefficients of the signature image, and an inverse discrete wavelet transform portion for performing inverse discrete wavelet transform using the separated N×N wavelet coefficients, thereby outputting a restored signature image.

Finally, the invention comprises a program media having stored thereon a computer program embodying the foregoing methods.

BRIEF DESCRIPTION OF THE DRAWINGS

The above objective and advantages of the present invention will become more apparent by describing in detail a preferred embodiment thereof with reference to the attached drawings in which:

FIG. 3 is a flow chart showing the steps of a digital image coding method according to the present invention; and FIG. 4. is a flow chart showing the steps of a digital image decoding method according to the present invention.

DESCRIPTION OF THE PREFERRED EMBODIMENTS

Figure 2:
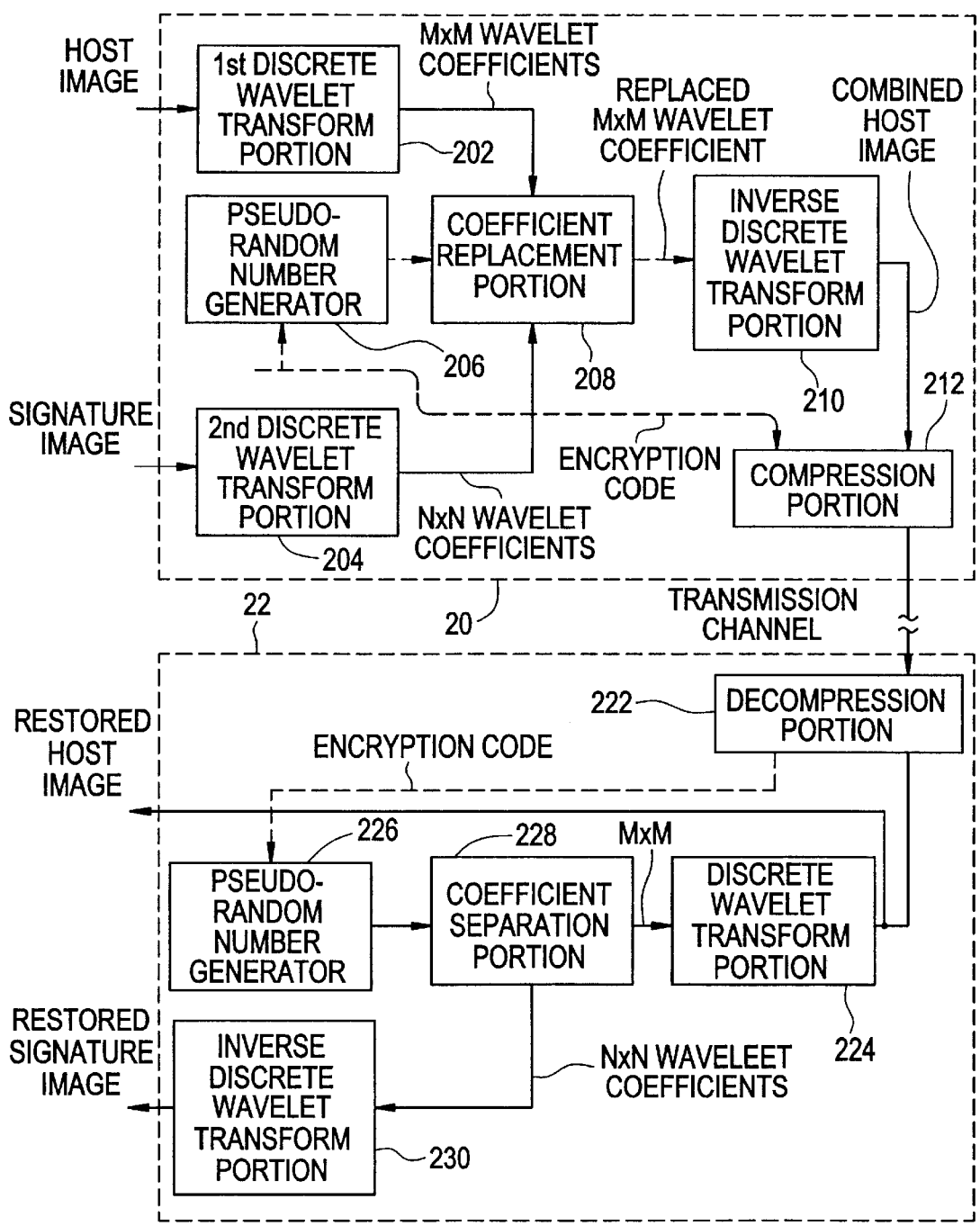
FIG. 2 is a block diagram illustrating a digital image coding apparatus and a digital image decoding apparatus according to the present invention.

FIG. 2 is a block diagram illustrating a digital image coding apparatus and a digital image decoding apparatus according to the present invention.

Referring to FIG. 2, the digital image coding apparatus 20 includes a first discrete wavelet transform portion 202, a second discrete wavelet transform portion 204, a pseudo-random number generator 206, a coefficient replacement portion 208, an inverse M×M discrete wavelet transform portion 210 and a compression portion 212.

In the operation of the digital image coding apparatus 20, the first discrete wavelet transform portion 202 receives a host image and performs discrete wavelet transform thereon. As a result, the first discrete wavelet transform portion 202 generates M×M discrete wavelet coefficients, M being a predetermined positive integer.

The second discrete wavelet transform portion 204 receives a signature image and performs discrete wavelet transform thereon. The scale of the signature image is smaller than that of the host image, as understood by one skilled in the watermarking related art. Thus, the matrix size of the wavelet coefficients of the signature image is smaller than that of the wavelet coefficients of the signature image. For example, the matrix size N of the wavelet coefficients of the signature image is preferably smaller than M of the wavelet coefficients of the host image, that is, N<0.5M. Therefore, the second discrete wavelet transform portion 204 outputs N×N discrete wavelet coefficients assuming that N is a predetermined positive integer smaller than M.

The pseudo-random number generator 206 receives an encryption code. The encryption code is for determining a predetermined rule for generating pseudo-random numbers. Thus, the pseudo-random number generator 206 generates the pseudo-random numbers in accordance with the rule corresponding to the encryption code.

The coefficient replacement portion 208 selects the replacing locations of N×N pixels using the pseudo-random numbers, and replaces the coefficients of the selected N×N pixel locations among M×M discrete wavelet coefficients with N×N wavelet coefficients, thereby outputting replaced M×M wavelet coefficients.

The inverse discrete wavelet transform portion 210 performs inverse discrete wavelet transform using the replaced M×M wavelet coefficients, thereby generating a host image combined with a signature image. Here, since the signature image in the combined host image is distributed throughout the entire host image and only the host image is discernible in view of the characteristic of wavelet transform, it can be concluded that successful watermarking has been done on the host image.

In order to transmit a watermarked host image, it is necessary to perform compression in consideration of limited channel characteristics. Thus, the compression portion 212 performs compression with respect to the watermarked host image, thereby outputting bitstreams. In this embodiment, the compression portion 212 also compresses the encryption code used by the pseudo-random number generator 206 in order to determine the conditions of generating pseudo-random numbers. Also, in this embodiment, the compression portion 212 performs compression on the basis of DCT. If DCT is performed on the watermarked image in which the signature image is distributed throughout the host image, the host image is emphasized. However, since the signature image is distributed throughout the host image, it is shapeless and temporally discontinuous. Also, fine signature image components are further attenuated. These properties allows the host image obtained by restoring the compressed combined host image to be used as it is during a decoding procedure to be described later.

By the above encoding procedure, bitstreams having the combined host image and encryption code compressed therein can be transmitted by sending the same via a transmission channel. In order to send the bitstreams via the transmission channel, a separate process is required. However, since there are many kinds of processes for sending the bitstreams, processors for performing the same are not shown in this embodiment.

Referring to FIG. 2, a digital image decoding apparatus 220 according to the present invention includes a decompression portion 222, a discrete wavelet transform portion 224, a pseudo-random number generator 226, a coefficient separation portion 228 and an inverse discrete wavelet transform portion 230.

Now, the operation of the digital image decoding apparatus 220 will be described. First, the decompression portion 222 receives the bitstreams having the combined host image and encryption code compressed therein and decompresses the same, thereby restoring the encryption code and the host image.

The discrete wavelet transform portion 224 performs a discrete wavelet transform on the restored host image to then output M×M wavelet coefficients.

The pseudo-random number generator 226 receives the encryption code output from the decompression portion 222. The encryption code is the same as that used in generating the pseudo-random numbers during encoding. Thus, the pseudo-random number generator 226 generates pseudo-random numbers in accordance with the same rule as that for encoding.

The coefficient separation portion 228 sets separating locations of N×N pixels using the pseudo-random numbers and separates the wavelet coefficients corresponding to the N×N pixel separating locations among M×M wavelet coefficients for the combined host image to then output N×N wavelet coefficients of the signature image.

The inverse discrete wavelet transform portion 230 performs inverse discrete wavelet transform using the separated N×N wavelet coefficients, thereby outputting a restored signature image.

In the above-described digital image coding apparatus according to the present invention, transmission is made such that a portion of signature image coefficients is superimposed on that of host image coefficients. Thus, addition of signature image coefficients does not increase the amount of transmitted data. Also, the digital image decoding apparatus does not necessitate the same original host image as that used at the transmission side in order to restore the signature image.

The above-described coding and decoding apparatuses may be implemented by one single codec apparatus as occasion demands.

FIG. 3 is a flow chart showing the major steps of a digital image coding method according to the present invention. Referring to FIG. 3, a host image is received and discrete wavelet transform is performed thereon, thereby outputting M×M discrete wavelet transform coefficients (M is a predetermined positive integer). Also, a signature image is received and discrete wavelet transform is performed thereon, thereby outputting N×N discrete wavelet transform coefficients (N is a predetermined positive integer smaller than M) (step 302).

Next, among M×M host image wavelet coefficients, locations of arbitrary N×N pixels are selected in accordance with a predetermined rule (step 304). Step 304 may comprise the sub-steps of receiving an encryption code for determining a predetermined rule for generating pseudo-random numbers to then generate the pseudo-random numbers in accordance with the predetermined rule corresponding to the encryption code, and selecting replacing locations of N×N pixels using the pseudo-random numbers, thereby outputting replacing location data of N×N pixels.

Then, the replacing location data, is received and the coefficients of N×N pixel locations are replaced with N×N signature image wavelet coefficients (step 306). Consequently, replaced M×M host image wavelet coefficients can be obtained.

Next, inverse discrete wavelet transform is performed using the replaced M×M host image wavelet coefficients (step 308). Consequently, a combined host image is generated.

Then, the combined host image is compressed with the encryption code (step 310). The compressed data may be transmitted via a communication channel, as occasion demands.

FIG. 4 is a flow chart showing the steps of a digital image decoding method according to the present invention. Referring to FIG. 4, bitstreams having compressed encryption code and host image are received and decompressed, thereby restoring the encryption code and the host image (step 402).

Next, a discrete wavelet transform is performed on the restored host image (step 404), thereby obtaining M×M host image wavelet coefficients (step 406).

Coefficients of N×N pixel locations among M×M host image wavelet coefficients are set to signature image wavelet coefficients in accordance with a predetermined rule (step 408). Step 408 may comprise the sub-steps of generating pseudo-random numbers in accordance with a predetermined rule corresponding to the encryption code obtained in step 402, setting separating locations of N×N pixels using the pseudo-random numbers, thereby outputting separating location data of N×N pixels, and separating wavelet coefficients corresponding to the N×N pixel separating location data as signature image coefficients, among M×M wavelet coefficients which are wavelet coefficients of the watermarked image, thereby obtaining N×N wavelet coefficients to then be set as signature image wavelet coefficients.

Next, inverse discrete wavelet transform is performed using the separated N×N wavelet coefficients, thereby obtaining a restored signature image (step 410).

Figure 1:
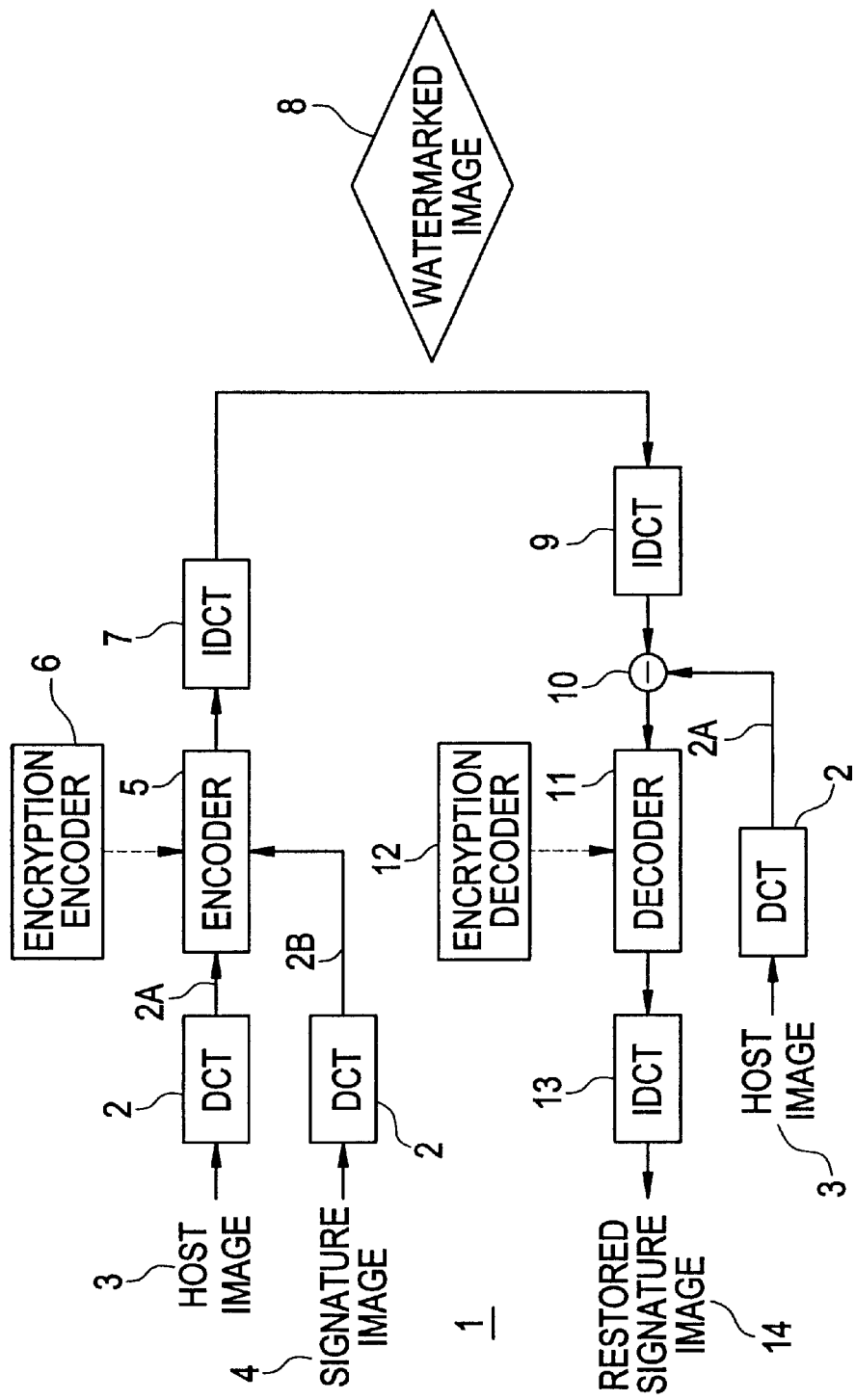
FIG. 1 is a block diagram illustrating a conventional digital image codec apparatus for recording and restoring a signature image using conventional watermarking.

The digital image coding and decoding methods are readily implemented by the digital image coding and decoding apparatuses shown in FIG. 1, respectively. Also, the digital image coding and decoding methods according to the present invention can be performed in a computer program. Also, they can be implemented by a general-use digital computer for operating the program employing a medium used in the computer. The medium includes a magnetic recording medium such as a floppy disk or a hard disk, an optical recording medium such as a CD-ROM or a DVD, and a broadcast medium such as Internet. Also, such functional programs, codes and code segments can be easily inferred by a programmer in the art to which the present invention is pertinent.

As described above, in the digital image coding apparatus according to the present invention, transmission is made such that a portion of signature image coefficients is superimposed on that of host image coefficients. Thus, addition of signature image coefficients does not increase the amount of transmitted data. Also, in the digital image decoding apparatus according to the present invention, the signature image can be restored without using the same original host image as that used at a transmission side.

The digital image coding and decoding methods disclosed herein can be embodied in and performed using a computer program. Also, the methods can be implemented by a general-use digital computer for operating a program on a storage media, where the storage employs any of electronic, magnetic or optical media conventionally used to permit access to the program by the computer. In particular, the medium may include a magnetic recording medium such as a floppy disk or a hard disk, and an optical recording medium such as a CD-ROM or a DVD. Also, such functional programs, codes and code segments can be easily generated by a programmer in the art to which the present invention is pertinent, without the use of undue experimentation.

While the present invention has been described in accordance with certain preferred embodiments, it is not limited thereto, and the applicant intends to obtain protection for the full scope of the invention as defined by the appended claims, in accordance with applicable law.

What is claimed is:

1. A digital image coding apparatus for recording a signature image on a host image using watermarking, comprising:
a first discrete wavelet transform portion operative to receive a host image and perform discrete wavelet transform thereon, and output M×M discrete wavelet coefficients where M is a predetermined positive integer;
a second discrete wavelet transform portion operative to receive a signature image and perform a discrete wavelet transform thereon, and output N×N discrete wavelet coefficients, where N is a predetermined positive integer smaller than M;
a pseudo-random number generator operative to receive an encryption code for determining a predetermined rule for generating pseudo-random numbers and generate the pseudo-random numbers in accordance with the predetermined rule corresponding to the encryption code; and
a coefficient replacement portion operative to select the replacing locations of N×N pixels using the pseudo-random numbers, and replace the coefficients of the selected N×N pixel locations among M×M discrete wavelet coefficients with N×N wavelet coefficients, and output replaced M×M wavelet coefficients.

2. The digital image coding apparatus according to claim 1, further comprising an inverse discrete wavelet transform portion operative to perform an inverse discrete wavelet transform using the replaced M×M wavelet coefficients to generate a combined host image.

3. The digital image coding apparatus according to claim 2, further comprising a compression portion operative to compress said combined host image prior to transmission.

4. A digital image coding method for recording a signature image on a host image using watermarking, comprising the steps of:
receiving a host image and performing discrete wavelet transform thereon, and outputting M×M discrete wavelet coefficients, where M is a predetermined positive integer;
receiving a signature image and performing discrete wavelet transform thereon, and outputting N×N discrete wavelet coefficients, where N is a predetermined positive integer smaller than M;
receiving an encryption code for determining a predetermined rule for generating pseudo-random numbers and generating the pseudo-random numbers in accordance with the predetermined rule corresponding to the encryption code;
selecting the replacing locations of N×N pixels using the pseudo-random numbers; and
replacing the coefficients of the selected N×N pixel locations among M×M discrete wavelet coefficients with N×N wavelet coefficients, thereby outputting replaced M×M wavelet 20 coefficients.

5. The digital image coding method according to claim 4, further comprising: performing inverse discrete wavelet transform using the replaced M×M wavelet coefficients to generate a combined host image.

6. The digital image coding method according to claim 5, further comprising: receiving and compressing the encryption code with the combined host image.

7. A digital image decoding apparatus for restoring a signature image embedded on a host image using watermarking, comprising:
a pseudo-random number generator operative to receive an encryption code and generate pseudo-random numbers in accordance with a predetermined rule according to the encryption code;
a coefficient separation portion operative to set separating locations of N×N pixels using the pseudo-random numbers and separate the wavelet coefficients corresponding to the N×N pixel separating locations among M×M wavelet coefficients, and output separated N×N wavelet coefficients; and an inverse discrete wavelet transform portion operative to perform an inverse discrete wavelet transform using the separated N×N wavelet coefficients, and output a restored signature image.

8. The digital image decoding apparatus according to claim 7, wherein the pseudo-random number generator is incorporated in the coefficient separation portion.

9. The digital image decoding apparatus according to claim 8, further comprising:

a decompression portion operative to receive a bitstream having the combined host image and encryption code compressed therein and decompress said bitstream to restore the encryption code and the host image; and a discrete wavelet transform portion operative to perform a discrete wavelet transform on the restored host image, and output M×M wavelet coefficients.

10. The digital image decoding apparatus according to claim 7, further comprising:

a decompression portion operative to receive a bitstream having the combined host image and encryption code compressed therein and decompress said bitstream to restore the encryption code and the host image; and a discrete wavelet transform portion operative to perform a discrete wavelet transform on the restored host image, and output M×M wavelet coefficients.

11. A digital image decoding method for restoring a signature image embedded on a host image using watermarking, comprising the steps of:

receiving an encryption code and generating pseudo-random numbers in accordance with a predetermined rule according to the encryption code;

setting separating locations of N×N pixels using the pseudo-random numbers;

separating the wavelet coefficients corresponding to the N×N pixel separating locations among M×M wavelet coefficients, and outputting separated N×N wavelet coefficients; and performing an inverse discrete wavelet transform using the separated N×N wavelet coefficients, and outputting a restored signature image.

12. The digital image decoding method according to claim 11, further comprising the steps of:

receiving a bitstream having the combined host image and encryption code compressed therein and decompressing said bitstream to restore the encryption code and the host image; and performing discrete wavelet transform on the restored host image, and outputting M×M wavelet coefficients.

13. A digital image codec apparatus for recording a signature image on a host image by using watermarking, and restoring the signature image from a watermarked image having the signature image embedded therein, comprising:

a first discrete wavelet transform portion operative to receive a host image and perform a discrete wavelet transform thereon, and to output M×M discrete wavelet coefficients where M is a predetermined positive integer;

a second discrete wavelet transform portion operative to receive a signature image and perform a discrete wavelet transform thereon, and to output N×N discrete wavelet coefficients, where N is a predetermined positive integer smaller than M;

a first pseudo-random number generator operative to receive an encryption code for determining a predetermined rule for generating pseudo-random numbers and generate pseudo-random numbers in accordance with the predetermined rule corresponding to the encryption code;

a coefficient replacement portion operative to select the replacing locations of N×N pixels using the pseudo-random numbers, and replace the coefficients of the selected N×N pixel locations among M×M discrete wavelet coefficients with N×N wavelet coefficients, and output replaced M×M wavelet coefficients;

a second pseudo-random number generator operative to receive the encryption code and generate pseudo-random numbers in accordance with a predetermined rule corresponding to the encryption code;

a coefficient separation portion operative to set separating locations of N×N pixels using the pseudo-random numbers, and separate the wavelet coefficients corresponding to the N×N pixel separating locations among M×M wavelet coefficients for the combined host image, and output N×N wavelet coefficients of the signature image; and an inverse discrete wavelet transform portion operative to perform an inverse discrete wavelet transform using the separated N×N wavelet coefficients, and output a restored signature image.

14. The digital image codec apparatus according to claim 13, further comprising:

an inverse discrete wavelet transform portion for performing an inverse discrete wavelet transform using the replaced M×M wavelet coefficients to generate a combined host image;

a decompression portion operative to receive a bitstream having the combined host image and encryption code compressed therein and decompressing the same, thereby restoring the encryption code and the host image; and a discrete wavelet transform portion operative to perform discrete wavelet transform on the restored host image, and to output M×M wavelet coefficients.

15. A computer readable medium including program codes executable by a computer to perform a digital image coding method for recording a signature image on a host image using watermarking, said method comprising:

receiving a host image and performing discrete wavelet transform thereon, and outputting M×M discrete wavelet coefficients, where M is a predetermined positive integer;

receiving a signature image and performing discrete wavelet transform thereon, and outputting N×N discrete wavelet coefficients, where N is a predetermined positive integer smaller than M;

receiving an encryption code for determining a predetermined rule for generating pseudo-random numbers and generating the pseudo-random numbers in accordance with the predetermined rule corresponding to the encryption code;

selecting the replacing locations of N×N pixels using the pseudo-random numbers; and replacing the coefficients of the selected N×N pixel locations among M×M discrete wavelet coefficients with N×N wavelet coefficients, thereby outputting replaced M×M wavelet coefficients.

16. The digital image coding method according to claim 15, further comprising: performing inverse discrete wavelet transform using the replaced M×M wavelet coefficients to generate a combined host image.

17. The digital image coding method according to claim 15, further comprising: receiving and compressing the encryption code with the combined host image.

18. A computer readable medium including program codes executable by a computer to perform a digital image decoding method for restoring a signature image embedded on a host image using watermarking, said method comprising:
- receiving an encryption code and generating pseudo-random numbers in accordance with a predetermined rule according to the encryption code;
- setting separating locations of N×N pixels using the pseudo-random numbers;
- separating the wavelet coefficients corresponding to the N×N pixel separating locations among M×M wavelet coefficients, and outputting separated N×N wavelet coefficients; and
- performing an inverse discrete wavelet transform using the separated N×N wavelet coefficients, and outputting a restored signature image.

19. The digital image decoding method according to claim 18, further comprising:
- receiving a bitstream having the combined host image and encryption code compressed therein and decompressing said bitstream to restore the encryption code and the host image; and
- performing discrete wavelet transform on the restored host image, and outputting M×M wavelet coefficients.

20. A digital image coding apparatus for recording a signature image on a host image using watermarking, comprising:
- a first discrete wavelet transform portion operative to receive a host image and perform discrete wavelet transform thereon, and output a first plurality of discrete wavelet coefficients;
- a second discrete wavelet transform portion operative to receive a signature image and perform a discrete wavelet transform thereon, and output a second plurality of discrete wavelet coefficients, where the second plurality is a predetermined positive integer smaller than the first plurality;
- a pseudo-random number generator operative to receive an encryption code for determining a predetermined rule for generating pseudo-random numbers and generate the pseudo-random numbers in accordance with the predetermined rule corresponding to the encryption code; and
- a coefficient replacement portion operative to select the replacing locations of a second plurality of pixels using the pseudo-random numbers, and replace the coefficients of the selected second plurality of pixel locations among the first plurality of discrete wavelet coefficients with a second plurality of wavelet coefficients, and output a first plurality of replaced wavelet coefficients.

21. The digital image coding apparatus according to claim 20, further comprising an inverse discrete wavelet transform portion operative to perform an inverse discrete wavelet transform using the second plurality of replaced wavelet coefficients to generate a combined host image.

22. A digital image coding method for recording a signature image on a host image using watermarking, comprising the steps of:
- receiving a host image and performing discrete wavelet transform thereon, and outputting a first plurality of discrete wavelet coefficients;
- receiving a signature image and performing discrete wavelet transform thereon, and outputting a second plurality of discrete wavelet coefficients, where the second plurality is a predetermined positive integer smaller than the first plurality;
- receiving an encryption code for determining a predetermined rule for generating pseudo-random numbers and generating the pseudo-random numbers in accordance with the predetermined rule corresponding to the encryption code;
- selecting the replacing locations of a second plurality of pixels using the pseudo-random numbers; and
- replacing the coefficients of the selected second plurality of pixel locations among a first plurality of discrete wavelet coefficients with a second plurality of wavelet coefficients, thereby outputting replaced first plurality of wavelet coefficients.

23. The digital image coding method according to claim 22, further comprising: performing inverse discrete wavelet transform using the replaced first wavelet coefficients to generate a combined host image.

24. A digital image decoding apparatus for restoring a signature image embedded on a host image using watermarking, comprising:
- a pseudo-random number generator operative to receive an encryption code and generate pseudo-random numbers in accordance with a predetermined rule according to the encryption code;
- a coefficient separation portion operative to set separating locations of a first plurality of pixels using the pseudo-random numbers and separate the wavelet coefficients corresponding to the first plurality of pixel separating locations among a second plurality of wavelet coefficients, and output a first plurality of separated wavelet coefficients; and
- an inverse discrete wavelet transform portion operative to perform an inverse discrete wavelet transform using the first plurality of separated wavelet coefficients, and output a restored signature image.

25. The digital image decoding apparatus according to claim 24, further comprising:
- a decompression portion operative to receive a bitstream having the combined host image and encryption code compressed therein and decompress said bitstream to restore the encryption code and the host image; and
- a discrete wavelet transform portion operative to perform a discrete wavelet transform on the restored host image, and output a second plurality of wavelet coefficients.

26. A digital image decoding method for restoring a signature image embedded on a host image using watermarking, comprising the steps of:
- receiving an encryption code and generating pseudo-random numbers in accordance with a predetermined rule according to the encryption code;
- setting separating locations of a first plurality of pixels using the pseudo-random numbers;
- separating the wavelet coefficients corresponding to the first plurality of pixel separating locations among a second plurality of wavelet coefficients, and outputting a first plurality of separated wavelet coefficients; and
- performing an inverse discrete wavelet transform using the first plurality of separated wavelet coefficients, and outputting a restored signature image.

27. The digital image decoding method according to claim 26, further comprising the steps of:
- receiving a bitstream having the combined host image and encryption code compressed therein and decompressing said bitstream to restore the encryption code and the host image; and performing discrete wavelet transform on the restored host image, and outputting a second plurality of wavelet coefficients.

28. A digital image codec apparatus for recording a signature image on a host image by using watermarking, and restoring the signature image from a watermarked image having the signature image embedded therein, comprising:

a first discrete wavelet transform portion operative to receive a host image and perform a discrete wavelet transform thereon, and to output a first plurality of discrete wavelet coefficients;

a second discrete wavelet transform portion operative to receive a signature image and perform a discrete wavelet transform thereon, and to output a second plurality of discrete wavelet coefficients, where the second plurality is a predetermined positive integer smaller than the first plurality;

a first pseudo-random number generator operative to receive an encryption code for determining a predetermined rule for generating pseudo-random numbers and generate pseudo-random numbers in accordance with the predetermined rule corresponding to the encryption code;

a coefficient replacement portion operative to select the replacing locations of a second plurality of pixels using the pseudo-random numbers, and replace the coefficients of the selected second plurality of pixel locations among a first plurality of discrete wavelet coefficients with a second plurality of wavelet coefficients, and output a first plurality of replaced wavelet coefficients;

a second pseudo-random number generator operative to receive the encryption code and generate pseudo-random numbers in accordance with a predetermined rule corresponding to the encryption code;

a coefficient separation portion operative to set separating locations of a second plurality of pixels using the pseudo-random numbers, and separate the wavelet coefficients corresponding to the second plurality of pixel separating locations among a first plurality of wavelet coefficients for the combined host image, and output a second plurality of wavelet coefficients of the signature image; and an inverse discrete wavelet transform portion operative to perform an inverse discrete wavelet transform using the second plurality of separated wavelet coefficients, and output a restored signature image.

* * * * *